(12) United States Patent
Vilhauer et al.

(10) Patent No.: US 8,612,782 B2
(45) Date of Patent: Dec. 17, 2013

(54) SYSTEM AND METHOD FOR DETERMINING MULTIPLE POWER LEVELS OF THE SUB-SYSTEMS BASED ON A DETECTED AVAILABLE POWER AND PRESTORED POWER SETTING INFORMATION OF A PLURALITY OF DIFFERENT COMBINATIONS OF THE SUB-SYSTEMS

(75) Inventors: Reed D. Vilhauer, Portland, OR (US); Darren S. Crews, Portland, OR (US); Paul S. Durley, Portland, OR (US); Kevin R. Mullen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 201 days.

(21) Appl. No.: 13/076,800

(22) Filed: Mar. 31, 2011

(65) Prior Publication Data

US 2012/0254633 A1  Oct. 4, 2012

(51) Int. Cl.
*G06F 1/00* (2006.01)
(52) U.S. Cl.
USPC .......................................................... 713/300
(58) Field of Classification Search
None
See application file for complete search history.

(56) References Cited

U.S. PATENT DOCUMENTS

| | | | |
|---|---|---|---|
| 6,127,809 A | 10/2000 | Kates et al. | |
| 6,184,660 B1 | 2/2001 | Hatular | |
| 2003/0142213 A1* | 7/2003 | Ali et al. | 348/180 |
| 2004/0095115 A1 | 5/2004 | Kernahan et al. | |
| 2005/0001600 A1 | 1/2005 | Morales | |
| 2005/0040787 A1 | 2/2005 | Choi | |
| 2006/0117194 A1* | 6/2006 | Nishida | 713/300 |
| 2008/0124059 A1 | 5/2008 | Okishima | |
| 2008/0150488 A1 | 6/2008 | Lu et al. | |
| 2009/0079383 A1* | 3/2009 | Fornage et al. | 320/101 |
| 2009/0093281 A1* | 4/2009 | Demirhan et al. | 455/574 |
| 2009/0189713 A1 | 7/2009 | Zhou | |
| 2009/0313484 A1* | 12/2009 | Millet et al. | 713/300 |
| 2009/0319808 A1* | 12/2009 | Brundridge et al. | 713/300 |
| 2010/0097035 A1* | 4/2010 | Buchholz et al. | 320/134 |
| 2012/0159200 A1* | 6/2012 | Ardron | 713/300 |

FOREIGN PATENT DOCUMENTS

WO  WO 2009/004284  1/2009

OTHER PUBLICATIONS

U.S. Office Action U.S. Appl. No. 12/646,139 dated Feb. 23, 2012.
International Search Report dated Jul. 30, 2012.

* cited by examiner

*Primary Examiner* — Thomas Lee
*Assistant Examiner* — Zhipeng Wang
(74) *Attorney, Agent, or Firm* — KED & Associates LLP

(57) ABSTRACT

A power control manager includes a processor to compute available power from a power source and a comparator to compare the available power to an amount of power to concurrently operate a plurality of sub-systems of an electronic device at full or a predetermined power. The processor generates one or more control signals in response to a decision signal output from the comparator. The control signals may indicate that a maximum power setting is to be set for a first sub-system and a reduced non-zero power setting is to be set for a second sub-system of the plurality of sub-systems. The sub-systems may be different sub-systems of a smartphone or another electronic device.

26 Claims, 10 Drawing Sheets

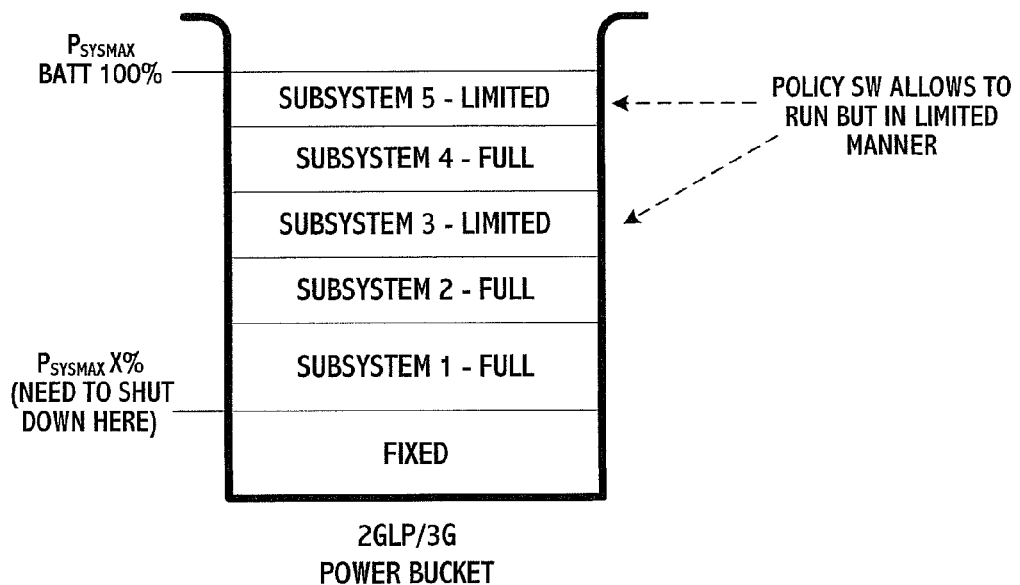
FIG. 6(a)
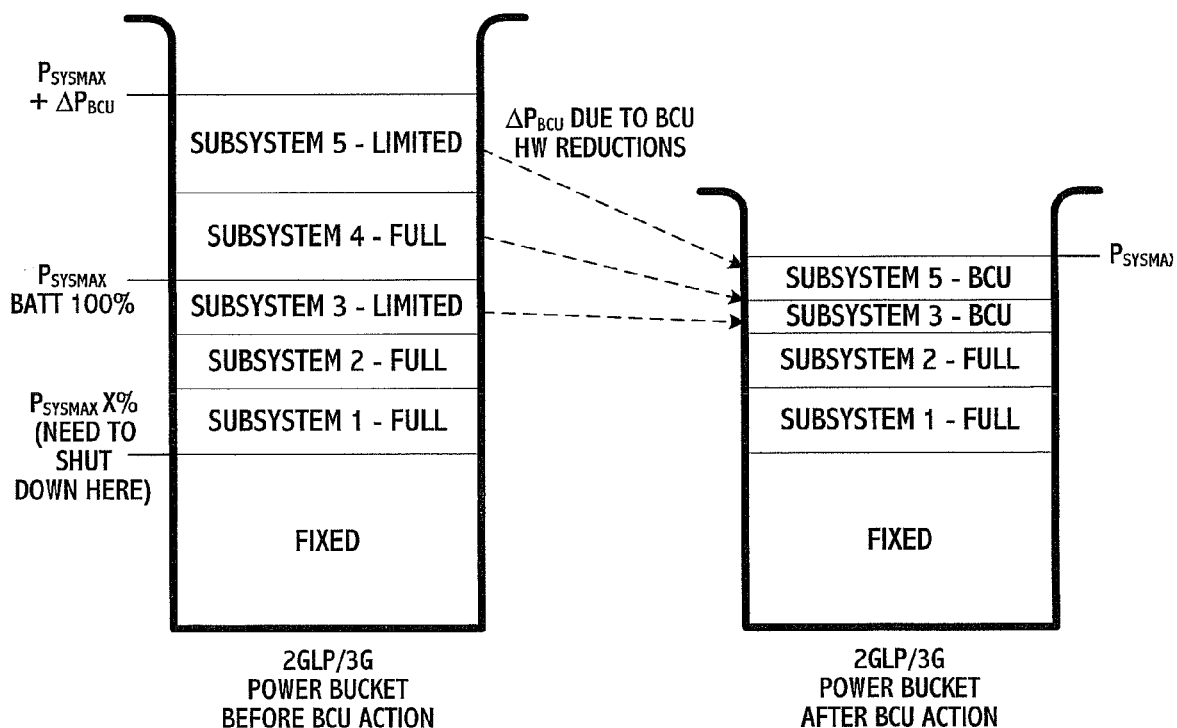
FIG. 6(b)   FIG. 6(c)

SYSTEM AND METHOD FOR DETERMINING MULTIPLE POWER LEVELS OF THE SUB-SYSTEMS BASED ON A DETECTED AVAILABLE POWER AND PRESTORED POWER SETTING INFORMATION OF A PLURALITY OF DIFFERENT COMBINATIONS OF THE SUB-SYSTEMS

FIELD

One or more embodiments herein relate to controlling power in an electronic device.

BACKGROUND

Smartphones, electronic cameras, and other devices have significantly improved the lives of consumers around the world. These devices are usually powered by batteries at least part of the time, and therefore power management is a central focus of system and chip designers.

BRIEF DESCRIPTION OF THE DRAWINGS

FIG. 6(a) shows an example of power control management for a 2G/3G application, FIG. 6(b) shows an example of power control management for a 2G application before burst controller power is provided, and FIG. 6(c) shows an example of power control management for a 2G application after burst controller power is provided.

DETAILED DESCRIPTION

Figure 1:
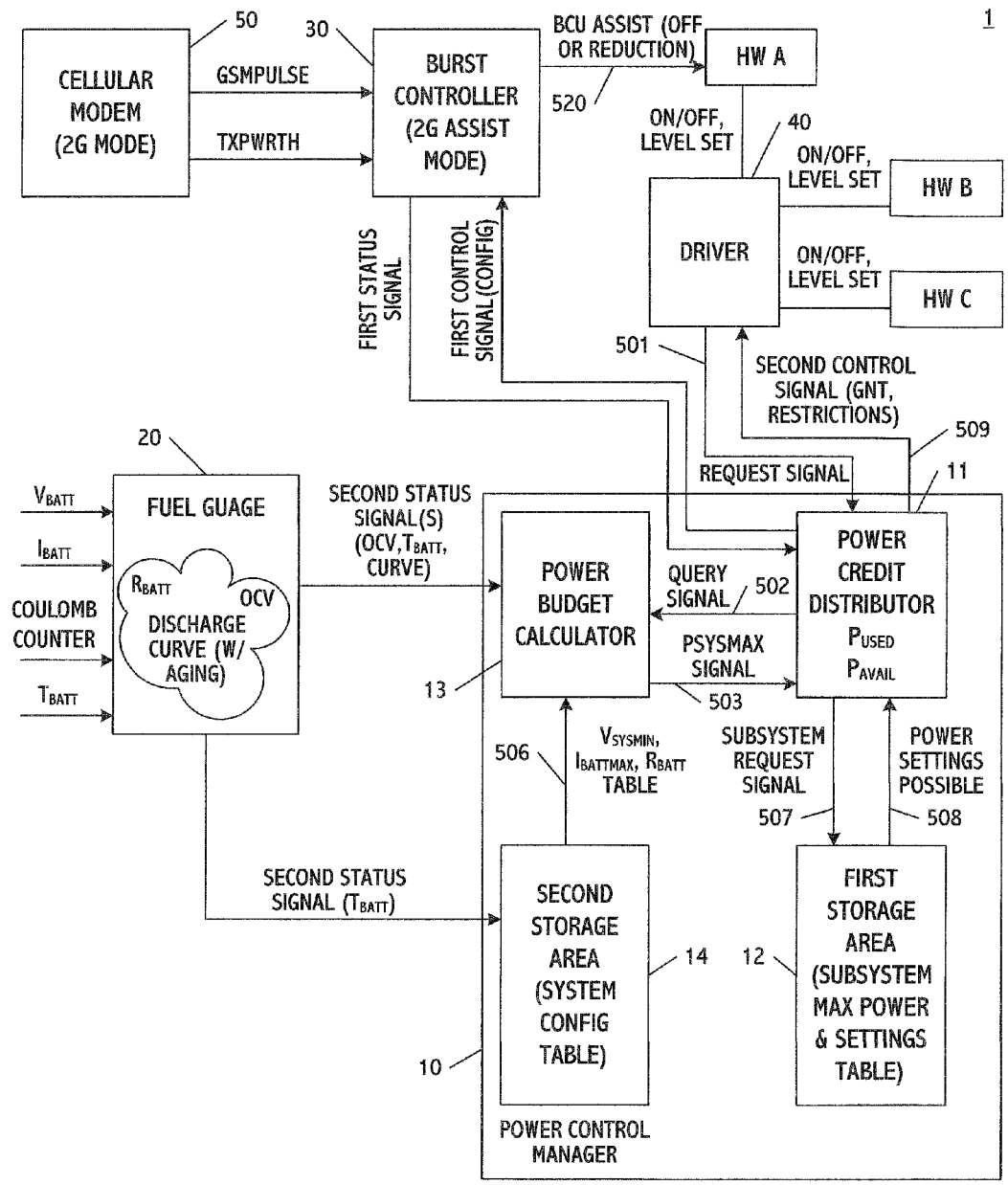
FIG. 1 shows an electronic device with a power control manager.

FIG. 1 shows one embodiment of the internal architecture 1 of an electronic device that includes a power control manager. The electronic device may be a smartphone, personal digital assistant, camera, laptop or notebook computer, mobile terminal with computing and/or communication capability, video processor, media player, speaker system, or any one of a number of other electronic devices capable of being powered by AC power, DC power, or both. While the power control manager is shown as being included within the electronic device, the power control manager may be coupled to the electronic device in other embodiments.

The power control manager may find particular use in managing power of a device driven by a battery at least part of the time. However, other types of power sources may be used in other embodiments including but not limited to ultracapacitors and photovoltaic sources.

If a battery is used, the battery may be a lithium-ion battery, a lithium-polymer battery, or another type of battery capable of providing power sufficient to operate one or more of a central processing unit (e.g., 1.6 GHz CPU), high-definition (HD) video engine, image sensor processor, camera flash, hands-free speakers and/or any one of a number of other features of the device.

As shown, the internal architecture of the electronic device may include the power control manager 10, a fuel gauge 20, and a burst controller 30. In an illustrative smartphone application, the power manager and its attendant features may operate in various modes including, for example, a Second Generation (2G) mode and a Third Generation (3G) mode. In other embodiments, the smartphone may operate in additional or different modes including a Fourth Generation mode.

The power control manager 10 generates signals to control the allocation of power among various circuits, sub-systems and/or functions of the device. While a battery is a power source in this embodiment, another type or a combination of power sources may be used in other embodiments. In order to perform its management functions, the power control manager may include a power credit distributor 11, a first storage area 12 that includes a sub-system maximum power and settings table, a power budget calculator 13, and a second storage area 14 that includes a system configuration table. The first and second storage areas may be part of a same recording medium (e.g., memory) within or coupled to the electronic device or may be located in different recording mediums.

The system configuration table 14 may be a look-up table that stores operational parameters which may be used as a basis for determining system failures attributable to, for example, maximum battery peak current consumption. These failures may arise when the electronic device draws significant power from the battery, usually in short, high power burst situations.

The operational parameters stored in the table may include, for example, one or more failure threshold values such as a voltage value (VSYSMIN) which provides an indication of a drop in battery voltage below a predetermined level (e.g., system minimum allowed voltage) caused by battery series IR and/or other losses, a current value (IBATTMAX) which corresponds to a level or range which causes a battery pack protection circuit to disconnect or otherwise prevents the system from receiving power from the battery, or a resistance value (RBATT) which provides an indication of the amount of series resistance from the battery cell to a system node (which will determine the I*R losses due to large peak currents).

These and/or other values stored in the system configuration table for managing power in the electronic device may be derived, for example, from system/device or circuit board specific information including, for example, one or more of board topology, routing resistances, system components, and battery details. The values stored in the system configuration table may correspond to various operating temperatures or may be fixed values.

The power budget calculator 13 determines the power available from the battery at a given time based on a system power envelope. The system power envelope includes a curve which provides an indication of the amount of power available for use in the system based on remaining energy/power in the battery, taking various factors such as temperature and/or age into consideration. According to one embodiment, the system power curve provides an indication of the amount of maximum power available for use in the system based on remaining battery power, and therefore such a curve may be referred to as a maximum system power envelope.

Figure 2:
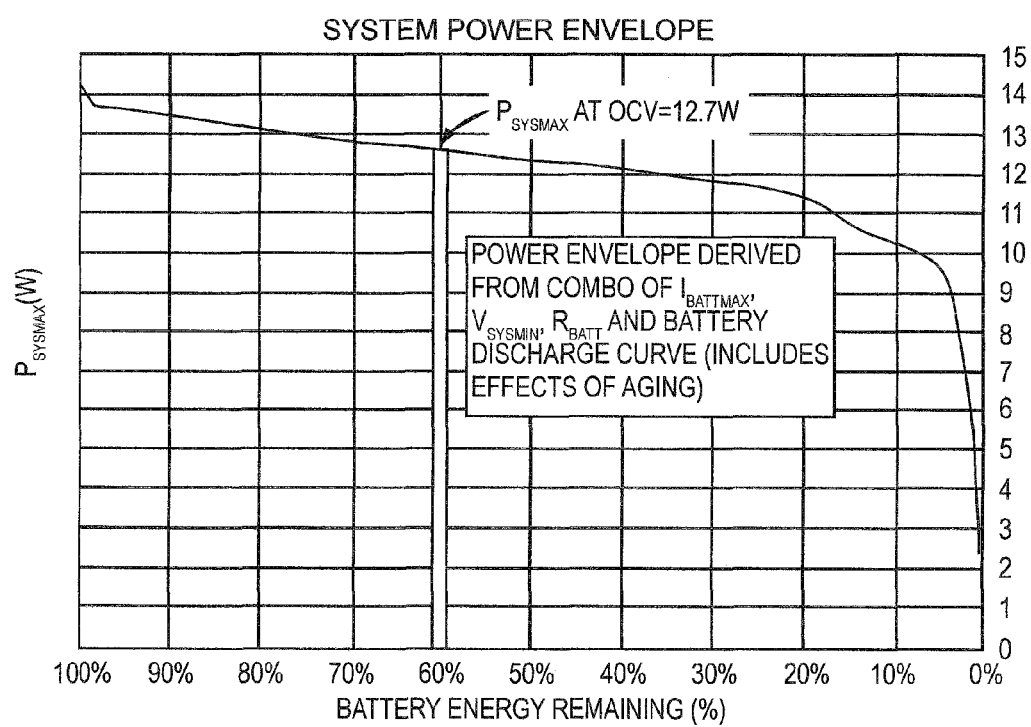
FIG. 2 shows an example of a system power envelope.

FIG. 2 shows one example of a maximum system power envelope including a curve that plots a percentage of remaining energy/power of the battery against maximum power available for use in operating the electronic device. The curve may be derived, for example, from a combination of parameters stored in the system configuration table, e.g., one or more of VSYSMIN, IBATTMAX, RBATT, and a battery discharge curve indicative of the effects of aging on battery/system performance.

In the example shown, the battery has 60% of its energy remaining at the point of time in interest. Using the maximum system power curve, a maximum system power (PSYSMAX) at an open circuit voltage (OCV) of approximately 3.84 voltage (V) is determined to be 12.7 Watts (W). A signal indicative of this value may be output from the power budget calculator and used as a basis for managing power in the device to be described in greater detail below.

The sub-system maximum power and settings table 12 may also include a look-up table that stores information indicative of the circuits, sub-systems, and/or functions (e.g., generically sub-systems) of the device that consume power and the amount of power each can burst to when turned on or otherwise when in use. As an example, this table may provide an indication of a base layer of sub-systems that are set to be fixed power consumers (e.g., system memory, storage, modem, etc.) either out of necessity or because of their unpredictable nature.

The look-up table may also store a second layer of information corresponding to sub-systems that turn on and of in a predictable manner, e.g., either based on user interaction or drive requests. The sub-systems of the second layer are ones which can be controlled and/or changed by the power control manager in order to run appropriate resources along the power envelope. As will be explained, in accordance with at least one embodiment power management is performed by controlling one or more sub-systems of at least the second layer.

The look-up table may also store information indicative of the settings of the electronic device in each of a plurality of modes. This information may include power settings that are possible in these modes, as well as the maximum power consumption of the device for each setting. For example, a display of the device may have 100% brightness when a backlight of the display is supplied with maximum power, and a lower level of brightness (e.g., 75%, 50%, and 25% not necessarily linear) when the backlight is supplied with power levels lower than maximum power.

The look-up table may also store information indicative of derating values for a plurality of sub-systems that consume power in the electronic device. Each derating value may indicate a fractional percentage of the maximum power of a corresponding circuit, sub-system, or function to be used in operating that sub-system for a present setting or mode of the device.

According to one implementation, the derating values may be used as a basis for determining how much to derate absolute worst-case theoretical power numbers. These values will, therefore, be useful in reducing power to sub-systems when other sub-systems are to receive maximum or different power levels, and/or in preventing too much power from being allocated to sub-systems not in use or ones subject to certain contingencies that do not currently exist, at least for the operational mode to which the electronic device is set.

An example of the maximum power and settings table for a mobile phone is shown below. This table shows subsystems of the phone, settings for the subsystems, and derating factors/values that may be used to control reductions in power to one or more of the subsystems.

TABLE 1

| Subsystem | Settings Possible | Derating Factor |
|---|---|---|
| Storage (eMMC) | N/A - FIXED | 0 |
| Memory (LPDDR2) | N/A - FIXED | 0 |
| Cellular PA | N/A - FIXED | 0.2/0 |
| Cellular BB/RFIC | N/A - FIXED | 0 |
| SOC - Baseline | N/A - FIXED | 0 |
| USB OTG host | On/Off Only | 0.1 |
| WiFi | On/Off Only | 0.2 |
| SDIO | On/Off Only | 0.3 |
| Camera Optics | On/Off Only | 0.2 |
| Vibra | On/Off Only | 0.2 |
| SOC-ISP (VNN) | On/Off Only | 0.2 |
| SOC - VED (VNN) | On/Off Only | 0.4 |
| SOC - VEC (VNN) | On/Off Only | 0.3 |
| SOC - CPU (VCC) | 1.6 GHz, 1 GHz, 600 MHz | 0.5 |
| SOC - GFX (VNN) | 0 to 100%, in 12.5% steps | 0.4 |
| Display | On/Off; Brightness (LCD vs. OLED difference) | 0.3 |
| Audio (VIHF) | 0 to 100% Volume | 0.1 |
| Camera LEDs - 'Torch' | 0 to 100% Brightness | 0 |
| Camera LEDs - 'Flash' | 0 to 100% Brightness | 0.1 |
| Camera Motor | 0 to 100% Speed | 0.2 |
| GPS | On/Low Power/Off | 0 |

In Table 1, a worst case power value for each subsystem may be derated by a predetermined factor to account for the statistical likelihood of its occurrence. This creates a maximum derated power value for each subsystem that will be used by the power control manager when allotting power to be 'checked out.' For example, the derating factor may be used as a basis for reducing the maximum power for a system according to the following equation: Reduced Power=$P_{MAX}$−(Derating Factor)*$P_{MAX}$. Thus, if the maximum power for the camera motor subsystem is 1 watt and the derating factor is 0.2, then the reduced power setting for this subsystem is 0.8 watts.

In addition to raw numbers, the table shows possible power settings of each subsystem. Some subsystems can only be on or off, while other subsystems may have many different (or interim) power settings based on circumstances and/or the system configuration.

According to one implementation, each derating value may be derived based on likelihood of worst case power to occur and a practical maximum power that the sub-system is likely to consume for a given setting or operational mode. Using these values will allow for more efficient power consumption in the device and more components to run in parallel at any given time, e.g., a greater quantity of power can be allocated to those circuits, sub-systems, and/or functions that are more relevant for a given setting or operational mode, shifting power away from or reducing power to less relevant circuits, sub-systems or functions.

According to one implementation, the derating values may be programmable and may be changed automatically during run time, for example, based on temperature, cellular reception, or other environmental factors or detectable quantities. In addition, the derating values may be set or selected based on one or more user preferences. In this way, the look-up table may be updated on a regular or even constant basis based on, for example, user location, usage patterns, and phone type just to name a few.

The power credit distributor 11 performs functions which include making decisions on system resources including power allocation based on the present state and operational mode of the device and its sub-systems. These decisions are based on signals and information received from the power budget calculator and the subsystem maximum power and settings table. Through the power credit distributor, the available power from the battery may be allocated in the most efficient manner possible or in a predetermined manner, to thereby ensure that the circuits, sub-systems, and/or functions most relevant to the present state and mode of the device receive sufficient or maximum level of possible power while reducing power to less-relevant sub-systems.

As an example, consider the case of a smartphone having a speaker and camera flash. Through the decision-making capability of the power credit distributor, power to the integrated hands-free (IHF) speaker playback sub-system may be provided to set a reduced (e.g., reduced maximum) volume and power to the camera flash sub-system may be provided to set a reduced flash brightness. At the same time, the power credit distributor may set maximum power to enable full brightness to the display backlight at high OCV and to set reduced power to enable lower display brightness and speaker volume at a low OCV. In other devices, these three sub-systems are not run simultaneously.

That is, in terms of device setting, this power allocation may be performed, for example, when all three sub-systems (display backlight, hands-free speaker, and camera flash) are operational, when the display is primarily in use and the capability of using the camera flash and speaker is also desirable, or under a different set of circumstances as defined by the information in the sub-system maximum power and settings table.

FIG. 6 shows a number of other exemplary power settings which may be controlled by the power credit distributor. In this figure, five subsystems are shown for a mobile phone. In FIG. 6(a), subsystems 1, 2, and 4 are operated at full power and subsystems 3 and 5 are operated at limited or reduced (but not zero) power for a 2G/3G application. Here, the maximum power is generated without assistance from the burst controller and all subsystems are run based on $P_{SYSMAX}$.

In FIG. 6(b), the same arrangement of subsystems is included but the maximum power and a power component from the burst controller is shown. In this scenario, the first three subsystems come within the system power $P_{SYSMAX}$ but the fourth and fifth subsystems exceed this power and are within a range of additional power that can be supplied by the BCU. The FIG. 6(b) application is for a 2G application and shows the power settings before the burst controller is used to supply power.

In FIG. 6(c), the power credit distributor may shut off power to the fourth subsystem, supply full power to the first and second subsystems and use burst controller power to operate the third and fifth subsystems for the 2G application.

The fuel gauge 20 may be implemented by a driver which, for example, may be a software application, one or more hardware circuits, or both, and performs the function of monitoring the status of a power source (e.g., a battery) of the electronic device. This monitoring function is performed based on one or more detection signals which, for example, may include battery voltage (VBATT), battery current (IBATT), battery temperature (TBATT), or a coulomb counter signal. Based on these signals, the fuel gauge generates information indicative of the open circuit voltage and also generates information indicative of battery discharge curve for a given age and temperature of the battery. Signals indicative of this information are then input into the power budget calculator.

The fuel gauge also sends a signal indicative of the detected battery temperature to the system configuration table 14. In response to this signal, the system configuration table generates signals indicative of one or more failure threshold values which may include one or more of VSYSMIN (indicative of battery voltage drop below a predetermined level, e.g., system minimum allowed voltage) caused by battery series IR and/or other losses), IBATTMAX (indicative of a level or range which causes a battery pack protection circuit to disconnect or otherwise prevents the system from receiving power from the battery), a RBATT as previously defined.

Based on the information received system configuration table 14 and fuel gauge 20, the power budget calculator 13 generates the system power envelope as previously explained and as illustratively shown in FIG. 2. When the power budget calculator receives a query from the power credit distributor 11, the power budget calculator sends a signal indicative of the maximum system power (PSYSMAX) at the detected open circuit voltage (OCV) to the power creditor distributor.

The power credit distributor sends its query signal in response to a request signal received from an element outside the power control manager. One example of this element is a software driver 40 as illustratively shown in FIG. 1. This driver may be coupled to one or more sub-systems. In the embodiment of FIG. 1, the software driver is shown coupled to three hardware sub-systems (HW A, HW B, HWC).

The software driver generates signals for independently controlling each hardware of these sub-systems, to be in an off-power state, full on-power state, or reduced power (level set) state based on control signals from the power credit distributor.

More specifically, in operation, the power control manager 10 may receive a status signal from burst controller 30. The status signal may indicate a status or condition of the burst controller at a given time and may be generated in response to information from a sub-system of the device, which, for example, may be a cellular modem 50. (While the modem in FIG. 1 is shown as operating in 2G Mode, in other embodiments the modem may operate in other modes including but not limited to 3G or 4G).

The burst controller 30 may generate its status signal based on one or more of a GSMPULSE (Global System for Mobile Communications pulse) signal or a TXPWRTH (transmission power threshold) signal. When either of these signals indicates that the electronic device is not currently communicating signals with a network or communications link or is not doing so in accordance with a particular standard, then a status signal may be sent from the burst controller to the power control manager indicating this status.

In response, the power control manager may reduce power to the burst controller in order to reallocate power to one or more other sub-systems currently in use. The reduction in power to the burst controller may be effected by a control signal (CONFIG) sent from the power credit distributor of the power control manager to the burst controller. Like the fuel gauge, the burst controller may be implemented in hardware, software, or both.

Figure 3:
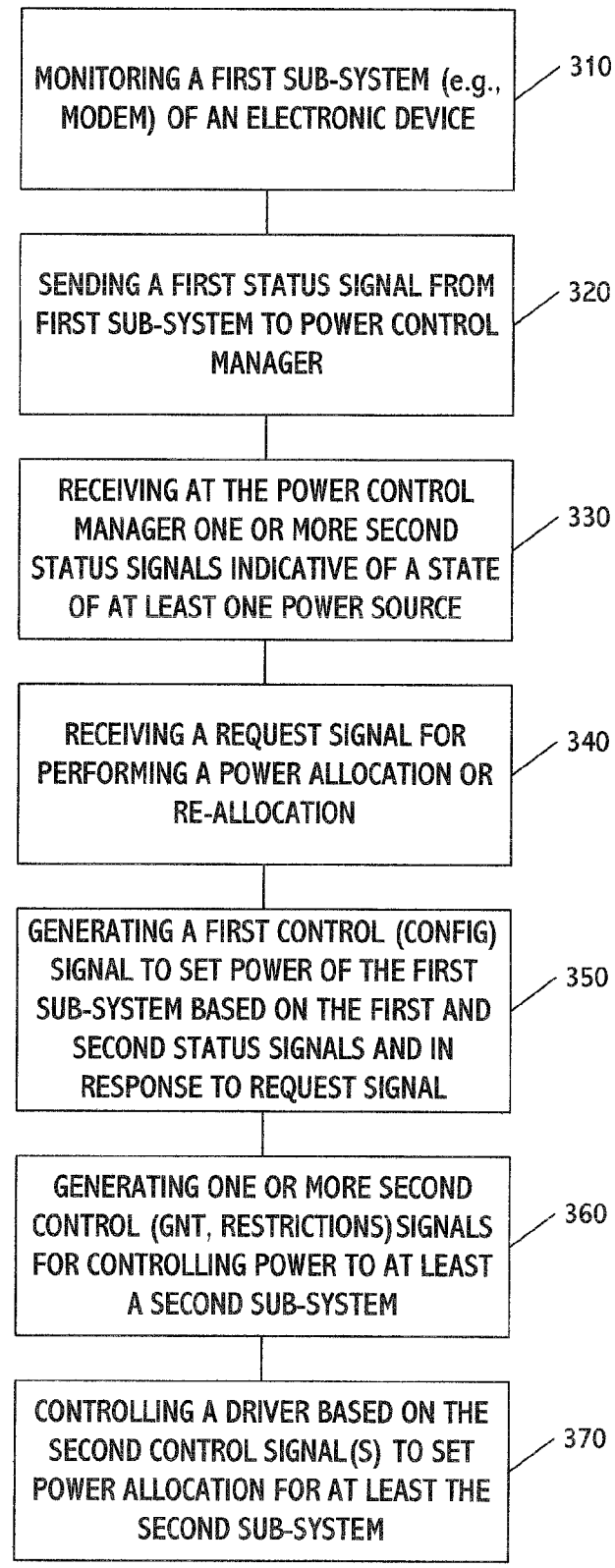
FIG. 3 shows one embodiment of a power control method.

FIG. 3 shows an example of a method for controlling power allocation in an electronic device. This method may be performed, at least in part, by the power control manager in FIGS. 1 and 2, and as indicated may be, in whole or part, implemented by software stored in a memory circuit of the device.

Initially, the method includes monitoring a first sub-system of the electronic device. The first sub-system may be a modem such as cellular modem 50 or another sub-system. (Block 310). The monitoring function may be performed by burst controller 30 based on signals (e.g., GSMPULSE and/or TXPWRTN signals) from the modem. The burst controller may be operating in 2G Assist Mode or another mode at this time.

Upon receiving the modem signals, the first sub-system (e.g., burst controller 30) generates and sends a first status signal to the power control manager 10. (Block 320). The power control manager also receives one or more second status signals indicating the status of at least one power source of the electronic device. (Block 330). These signals may be received from fuel gauge 20. Also, the power source may be a battery and the second status signals may be generated based on a detected battery voltage, current, and/or temperature, as well as a coulomb counter, taking age into consideration as previously described.

The one or more second status signals may be indicative of the open circuit voltage as determined by the fuel gauge and battery temperature, and/or other information indicative of the current operational state and remaining energy/power capacity of the battery.

The power control manager also receives a request signal for performing a power allocation operation. (Block 340). The request signal may be received, for example, from a driver (e.g., software driver 40) of one or more sub-systems, circuits, or functions of the electronic device. The driver may be one capable of applying a range of power levels to corresponding sub-system(s) that range from off power to a minimum power level to a maximum power level. In accordance with one implementation, one sub-system (e.g., HW A) may be coupled to the burst controller to receive a signal corresponding to full burst control power assist, reduced burst control power assist, or no burst control power assist (off).

The request signal may be generated when a setting or configuration of the electronic device has changed. For example, when one or more sub-systems turn on or off, the setting or configuration of the device may change, which, in turn, may require a reallocation of power in order to maintain efficient performance and/or to allocate more power to certain sub-systems and reduced power to other sub-systems. The sub-systems subject to power reallocation may be ones with variable power requirements, such as, for example, any of those corresponding to the second layer previous described, i.e., ones that do not have fixed power requirements or do not turn on and off in a predictable manner.

In response to the request signal and based on first and second status signals, the power control manager generates a first control signal (CONFIG) to set power of the first sub-system, e.g., the burst controller 30. (Block 350). The first control signal may regulate the power to the burst controller and/or to place the burst controller in a different mode of operation (e.g., from 2 GHP mode to 3 GHP mode, or vice versa). If a power regulation is intended, the first sub-system may involve reducing the power of the first sub-system to a lower level, so that power may be reallocated to another sub-system currently intended for use.

In response to the request signal and based on first and second status signals, the power control manager may also generate one or more second control signals (GNT, restrictions) to set power of at least a second sub-system. (Block 360). Here, GNT is a grant signal sent from the power control manager to the requesting subsystem indicating whether power is to be used and what restrictions, if any, are to be applied.

In the embodiment of FIG. 1, a second control signal may be sent, for example, from the power control manager to driver 40, which then changes the allocation of power to one or more of the hardware sub-systems HW A, H W B, or HW C given a current setting or configuration of the electronic device, e.g., given a change in functionality of the device. (Block 370).

The change in functionality of the device may involve, for example, a sub-system activated by a user. This user-activated sub-system may be any one of a variety of features including a camera or camera flash, music player, phone call, phonebook application, speakerphone activation, or any combination of these or other features. Depending on the sub-system(s) selected, the power control manager may change or otherwise control power allocation to give maximum power to one or more activated sub-systems and reduced power to one or more other sub-systems.

Thus, for example, driver 40 may set sub-system HW A to a first reduced power level, may set sub-system HW B to a second reduced power level, and provide maximum power to the third sub-system HW C. The first and second reduced power levels may be same or different levels, e.g., different predetermined reduced-power states. Based on the second control signal(s) from the power control manager, the driver may even turn off other sub-systems that were once previously powered.

Figure 4:
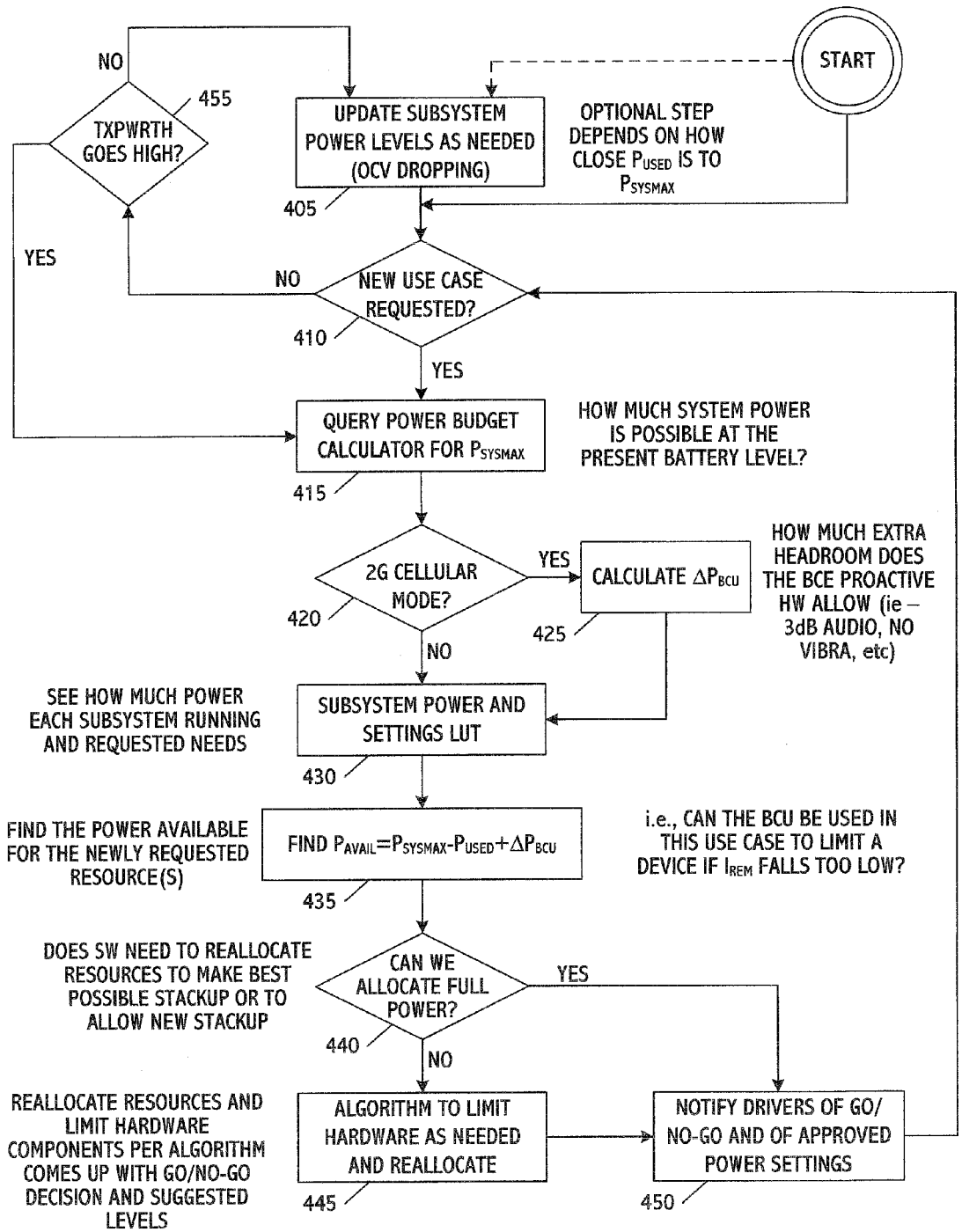
FIG. 4 shows operations included in a method for determining power settings for a combination of sub-systems of the electronic device.

FIG. 4 shows operations which may be performed by the power control manager in generating the first and second control signals in the illustrative case of a smartphone which is capable of operating in 2G and 3G modes.

An initial operation includes receiving a request signal 501 from driver 40. (Block 410). The request signal is sent to the power control manager 10 to request power, or a change in the allocation of power, for one or more of the sub-systems of the electronic device. Such a request signal may be generated, for example, when a new sub-system is to be activated, either automatically by a system processor or manually as a result of a user input signal, when a sub-system that has previously been activated has been turned off or is to be set to a lower-power setting, thereby freeing up more power for other sub-systems, or when a different combination of sub-systems is to be activated. Each of these "new use cases" may correspond to different setting of the smartphone.

As shown, the request signal may be received by the power credit distributor 11 of the power control manager. Once the request signal is received, the power credit distributor may send a query signal 502 to the power budget calculator 13 to determine the maximum system power available (PSYSMAX) at that time. (Block 415). This power may be derived from the battery, a combination of batteries, or another power source or combination of power sources.

When the power source is a battery, PSYSMAX may be determined based on the system maximum power envelope (an example of which is shown in FIG. 2) based on remaining battery energy/power/charge. As indicated, this envelope (and thus PSYSMAX) is determined based on information stored in the system configuration table 12, and optionally based on the age and/or temperature of the battery. The information in table 12 may be sent to the power budget calculator along signal line 506.

Using the system maximum power envelope, the power budget calculator determines locates the remaining percentage of battery power and then using the curve outputs a power signal 502 indicative of power PSYSMAX for a corresponding open circuit voltage. As discussed, PSYSMAX provides an indication of the amount of system power that is available for use in the smartphone at the present state of the battery.

Upon receiving power signal 502, the power credit distributor determines whether the smartphone is operating in a predetermined mode of operation, e.g., determines whether the smartphone is operating in 2G cellular mode or another mode. (Block 420). This determination may be made, for example, by determining whether the modem 50 is operating in a call mode, based on a mode of operation of the burst controller 30, and/or based on signals received from a base station indicating that only 2G service is available. Other methods for determining whether the smartphone is operating in 2G may also be used in this block.

According to one example, when power signal 502 is received, the power credit distributor analyzes a first status signal 504 received from the burst controller to determine a configuration of this controller. Based on the first status signal, a determination can be made as to the operational mode of the modem. The power credit distributor may also send a first control signal 505 to the burst controller to change the configuration of the controller and/or modem when, for example, a 3G mode is to be used or when burst assist power is to be supplied to one of the sub-systems, e.g., HW A.

Based on the first status signal 504, the power creditor distributor may also determine whether the burst controller 30 can be used to increase possible power usage (e.g., provide additional power) to one or more of the sub-systems. This determination may be made by the power credit distributor calculating a differential power value ($\Delta P_{BCU}$) which provides an indication of how much additional power (e.g., so-called extra headroom) the burst controller can provide based on, for example, factors which include 3 dB audio, no vibration, etc. (Block 425).

Put differently, the different power value ($\Delta PBCU$) may provide an indication of the amount by which battery power consumption can be reduced based on overrides over which the burst controller has control. These overrides include camera flash disable, hands-free audio volume reduction, PROCHOT#assertion, and vibration disable. Such an override signal 520 is illustratively shown in FIG. 1 relative to sub-system HW A. (PROCHOT# is an optional input signal to a system-on-chip (SOC) application, which is used to "throttle" the SOC (lower speed) and thus lower active power consumption. This signal can be driven from any system or sub-system component, one example of which is the burst controller.)

The power credit distributor may calculate the differential power value ($\Delta PBCU$) as corresponding to the amount of power that the burst controller will reduce the system power consumption by given the BCU configuration. In one example, there may be four main "knobs" whose power is to be reduced by the BCU, namely the IHF audio (−50 or 75% power), vibra (−100% power), the camera flash (−100% power), and the CPU (−10 to 50% power). The $\Delta PBCU$ value may be determined by a look up table, an example of which is in Table 2 for 2G mode.

TABLE 2

| Subsystem | BCU Action on . . . | Pmax (W) | BCU Action | $\Delta P_{BCU}$(W) |
|---|---|---|---|---|
| Vibra | GSMPULSE & TXPWRTH | 2.288 | Turn off VIbra | 2.288 |
| CPU | GSMPULSE & TXPWRTH & IA_BURSTMODE | 0.800 | Assert PROCHOT# (BFM to LFM) | 0.65 |
| Audio (VIHF) | GSMPULSE & TXPWRTH | 5.490 | Lower Volume (3 or 6 dB) | 2.745 (−3 dB) 4.11 (−6 dB) |
| Camera LEDs - 'Torch' | GSMPULSE & TXPWRTH | 0.650 | Disable Camera LEDs | 0.650 |
| Camera LEDs - 'Flash' | GSMPULSE & TXPWRTH | 5.490 | Disable Camera LEDs | 5.490 |
|  |  |  | Max BCU Headroom Allowance | 13.13 |

Table 3 shows examples of how power may be controlled by the power credit distributor for 3G mode applications, where the subsystems correspond to baseline circuits, camera LED flash, audio speakers, and a display. The table provides different values for different OCV voltage cases and different maximum system power values.

TABLE 3

| Battery State/Psysmax | Subsystem | Pmax (W) | Pderated (W) | Pgranted (W) | Setting allowed |
|---|---|---|---|---|---|
| 90% OCV; Psysmax = 13.4 W | Baseline - Memory, Storage, 3G, SOC | 4.33 | 4.33 | 4.33 | ON - 100% |
|  | Camera LEDs - 'Flash' | 5.49 | 4.94 | 4.94 | ON - 100% |
|  | IHF Audio | 5.49 | 4.94 | 2.8 | ON - 56% |
|  | Display | 1.53 | 1.22 | 1.22 | ON - 100% |
|  | Ptotal | 16.84 | 15.43 | 13.3 |  |
| 20% OCV: Psysmax = 11.4 W | Baseline - Memory, Storage, Cellular, SOC | 4.33 | 4.33 | 4.33 | ON - 100% |
|  | Camera LEDs - 'Flash' | 5.49 | 4.94 | 4.94 | ON - 100% |
|  | IHF Audio | 5.49 | 4.94 | 1.21 | ON - 56% |
|  | Display | 1.53 | 1.22 | 0.92 | ON - 75% |
|  | Ptotal | 16.84 | 15.43 | 11.4 |  |

Once the differential power value has been calculated, the power credit distributor sends a request signal 507 to the sub-system maximum power and settings table, in order to determine (1) the amount of power each running sub-system is consuming and (2) the amount of power that is required to satisfy the new use case in Block 410, e.g., amount of power required to run the different combination of sub-systems requested based on signal 501 from the driver. (Block 430).

In response to signal 507, table 12 sends setting information to the power credit distributor along signal line 508. The setting information indicates one or more different power settings for the different combination of sub-systems requested based on signal 501.

If the system is not running in the predetermined mode of operation, process flow passes from Block 420 to Block 430 while bypassing the calculation in Block 425.

Next, the power credit distributor determines the power available (PAVAIL) in the system to satisfy the new sub-system or different combination of sub-systems requested by signal 501. (Block 435). The available power may be determined by the following equation:

$$PAVAIL = PSYSMAX - PUSED + \Delta PBCU$$

where PUSED is the power in use before the new use case was requested by request signal 501.

From this equation, it is evident that the burst controller may be used to supply additional power to help concurrently run, at least for a limited time, the combination of sub-systems that results based on signal 501. Thus, for example, if the surplus (amount of available but presently unused) power in the system (indicated by PSYSMAX-PUSED) is insufficient for purposes of concurrently powering the combination of sub-systems that result from request signal 501, then a determination is made as to whether the additional power of $\Delta PBCU$ will be sufficient to power that combination. (Block 440).

Put differently, the power value calculated in Block 435 and the inquiry in Block 440 may be performed by the power credit distributor to determine whether there is enough available power to run each sub-system in the combination of the sub-systems at full power. And, if not, whether additional power supplied by the burst controller is sufficient to run all the sub-systems in the combination at full power.

The mode of the radio circuits in the smartphone may be used to determine whether the burst controller will be able to provide additional power (e.g., perform a so-called burst control unit (BCU) assist function) for operating each of the combination of sub-systems at maximum power. In 2 G operation, for example, the burst controller can reduce its own power quickly based on power warning signals GSM PULSE and TXPWRTH previously discussed.

If the answer to the inquiry in Block 440 is yes, then the power credit distributor may generate a GO signal along signal line 509 to notify the driver that the each of the sub-systems in the combination are to be run at maximum power. (Block 450). For example, in the case where there is sufficient available power, the camera flash, display backlight brightness, and audio volume may all be run at maximum.

If the answer to the inquiry in Block 440 is no, then the power credit distributor will instruct the driver (based on second control signal sent on line 509) that one or more of the sub-systems in the combination are to be run at less than maximum power. (Block 445). The specific power levels at which the sub-systems are to be run are determined based on the allocation of power settings output from the sub-system maximum power and settings table 14.

For example, the settings may indicate that one of the sub-systems in the combination is to be run at maximum power and one or more other concurrently running sub-systems are to run at one or more lower (but non-zero) power levels. By limiting the allocation of power to less than maximum power to one or more of the concurrently running sub-systems, those sub-systems may be maintained at an operation state and at the same time at a power level that does not fall below a minimum operating level, e.g., at a level that avoids a VSYSMIN or IBATTMAX failure from occurring.

Examples of how this power allocation among sub-systems to be concurrently run based on request signal 501 are as follows.

Setting one of the sub-systems to maximum power level and remaining sub-system(s) to be concurrently run at one or more lower non-zero power levels.

Setting a first subset of sub-systems to maximum power and a second sub-set of one or more sub-systems to the same or different lower non-zero power levels. For example, assume the smartphone is processing a call while the hands-free speakers are run at maximum power.

If, during this time, the user makes a selection to turn on the camera of the phone to take a flash picture, the power credit distributor may generate one or more control signal that instruct the driver to drive the flash at maximum brightness. To account for this additional use of power, power to the speakers may be set to a lower level so that the speaker volume is simultaneously run at a lower maximum volume level.

Conversely, the power credit distributor may generate control signals to the driver to run the flash at a lower power level (and commensurately a lower flash brightness) while simultaneously running the hands-free speakers at maximum power, and thus maximum volume. Either way, the power allocation effected by the control signals from the power credit distributor is set based on the predetermined setting information stored in table 14.

By controlling power allocation using the power control manager, system failures that occur in other systems may be avoided, and at the same time sub-systems which previously could not be concurrently run may be concurrently run to offer greater functionality to the user. Moreover, this will allow for enhanced video processing (high-definition, e.g., 1080p) capability on smartphone or other devices. For example, 1080p video playback may run on a 2G/3G network with high- or full-volume hands-free speaker audio while concurrently running other system hardware such as wireless (WiFi) radio, secure digital (SD) card, or universal serial bus (USB) Host circuits.

Of course, the power control manager may generate control signals that completely turn off one or more sub-systems, while running some sub-systems at full power and others at reduced-power levels as determined, for example, by the information in the settings table 14.

Returning to Block 410 in FIG. 4, if a new use case is not detected, the burst controller 30 may perform a check to determine whether the transmission power threshold (TXPWRTH) signal from modem 50 corresponds to a value (e.g., high) which indicates that the smartphone has entered 2G mode. (Block 455). If not, control may return to Block 405. If yes, then control may pass to Block 41 to determine whether a new use case has been requested based on signal 501.

One optional operation may include updating sub-system power levels at predetermined or regular intervals for OCV dropping. (Block 405). This step may be performed based on a difference between PSYSMAX and PUSED, and more specifically whether this difference falls to within a predetermined range of values. The method of FIG. 4 may begin with this step as indicated by the dotted line.

Figure 5:
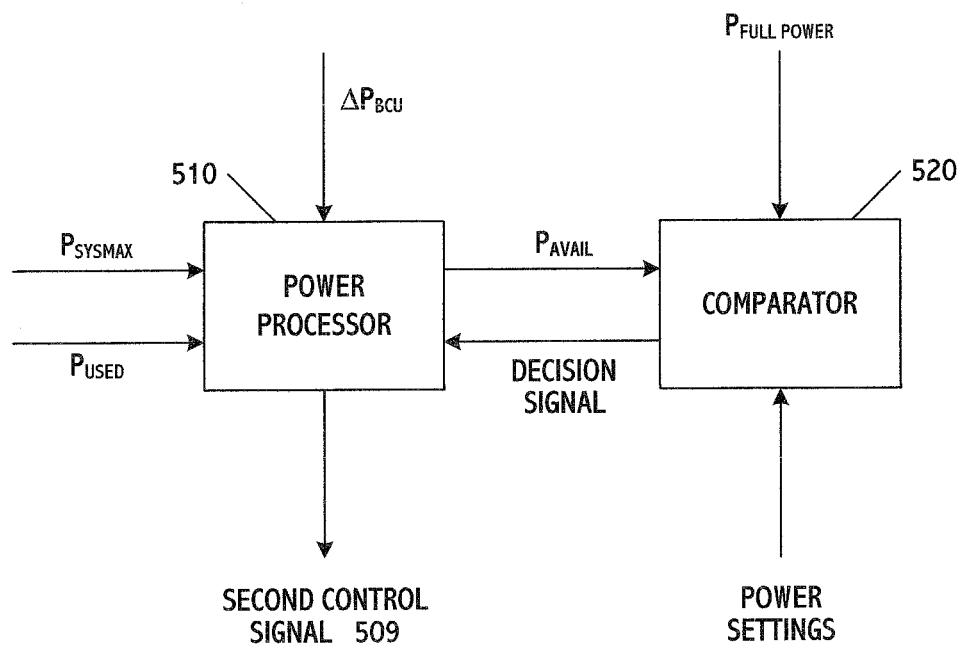
FIG. 5 shows one embodiment of the power credit distributor in FIG. 1.

FIG. 5 shows one embodiment of the power credit distributor in FIG. 1, which performs functions analogous to the operations in the method of FIG. 4. As shown, the power credit distributor includes a power processor 510 to compute available power from a power source and a comparator 520 to compare the available power to an amount of power required to concurrently operate a plurality of sub-systems of an electronic device at full power.

The power processor generates one or more control signals in response to a decision signal output from the comparator. The decision signal may indicate that the available power is less than the amount of power to concurrently operate the plurality of sub-systems of the device when each of the sub-systems (which may be a subset of all the sub-systems of the device, e.g., smartphone) is operated at maximum power. When related to FIG. 4, the decision signal may therefore be output when, for example, PAVAIL<PUSED, where PAVAIL=PSYSMAX−PUSED+ΔPBCU. In other embodiments, a different equation or criteria may be used for generating the decision signal.

The one or more control signals generated by the power processor may indicate that a maximum power setting is to be set for a first sub-system and a reduced non-zero power setting is to be set for a second sub-system of the plurality of sub-systems. The power processor may generate the control signals (e.g., second control signal 509) in response to a request signal (e.g., request signal 501) indicating the first sub-system or the second sub-system is to changed from a non-active state to an active state. As previously discussed, the request signal may be generated in response to a user request signal for activation of the first or second sub-system.

Moreover, in accordance with the previously provided equations, the power processor may generate the one or more control signals when a sum of the available power and burst controller power minus an amount of power currently in use in the electronic device is less than an amount of power to concurrently operate a combination of sub-systems including the first and second sub-systems at full power.

Further, as in the case of FIG. 4, the reduced non-zero power setting may based on at least one derating value received for the second subsystem, which derating value may be stored in the first storage area corresponding to the sub-system maximum power and settings table 14.

Figure 7:
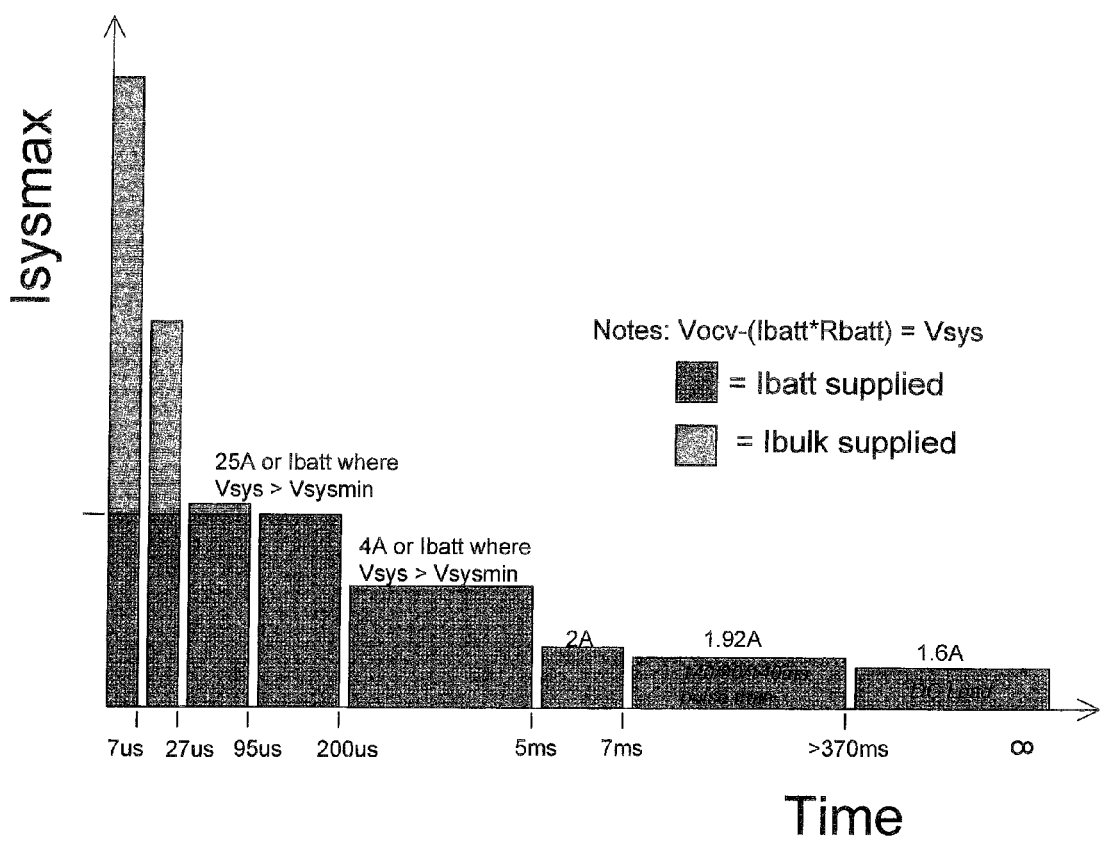
FIG. 7 shows an example of a relationship between open-circuit voltage and system voltage and how current ($I_{SYSMAX}$) may vary over time based on this relationship.

FIG. 7 shows an example of how the open-circuit voltage ($V_{OCV}$ and the system voltage $V_{SYS}$) may be related to one another and how current ($I_{SYSMAX}$) may vary over time in accordance with one non-limiting embodiment. The illustrative relationship in FIG. 7 may obtain for any of the embodiments disclosed herein.

Figure 8:
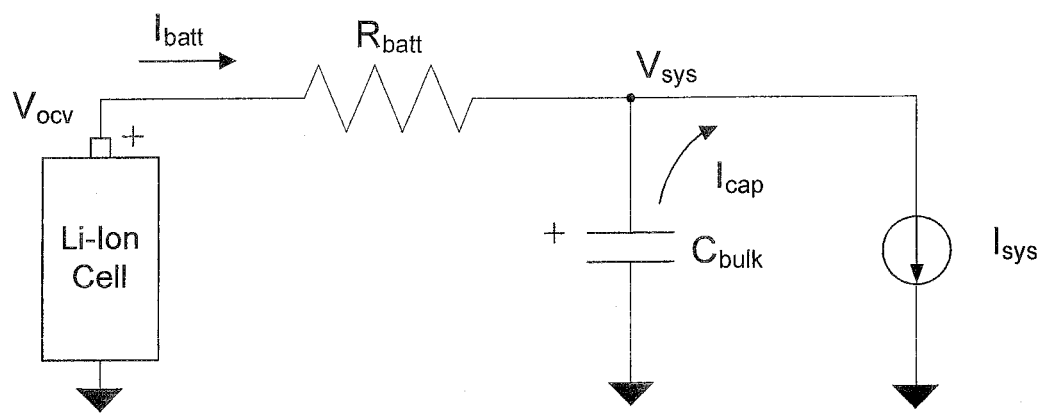
FIGS. 8-10 show circuits that may be used to distribute current in the device.
Figure 9:
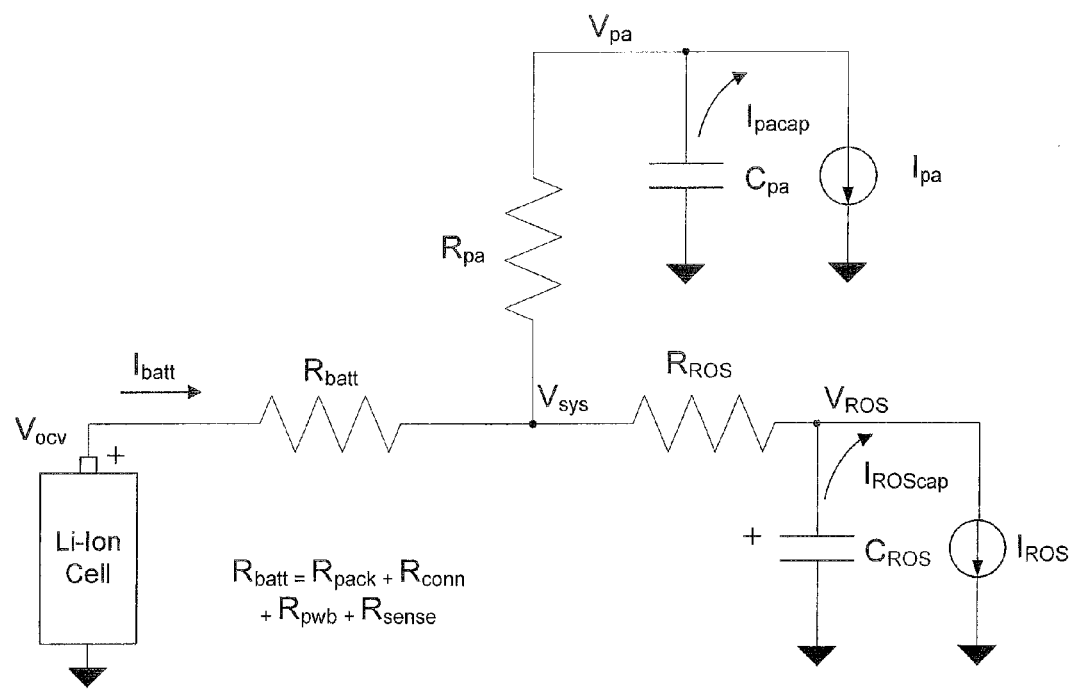
Figure 10:
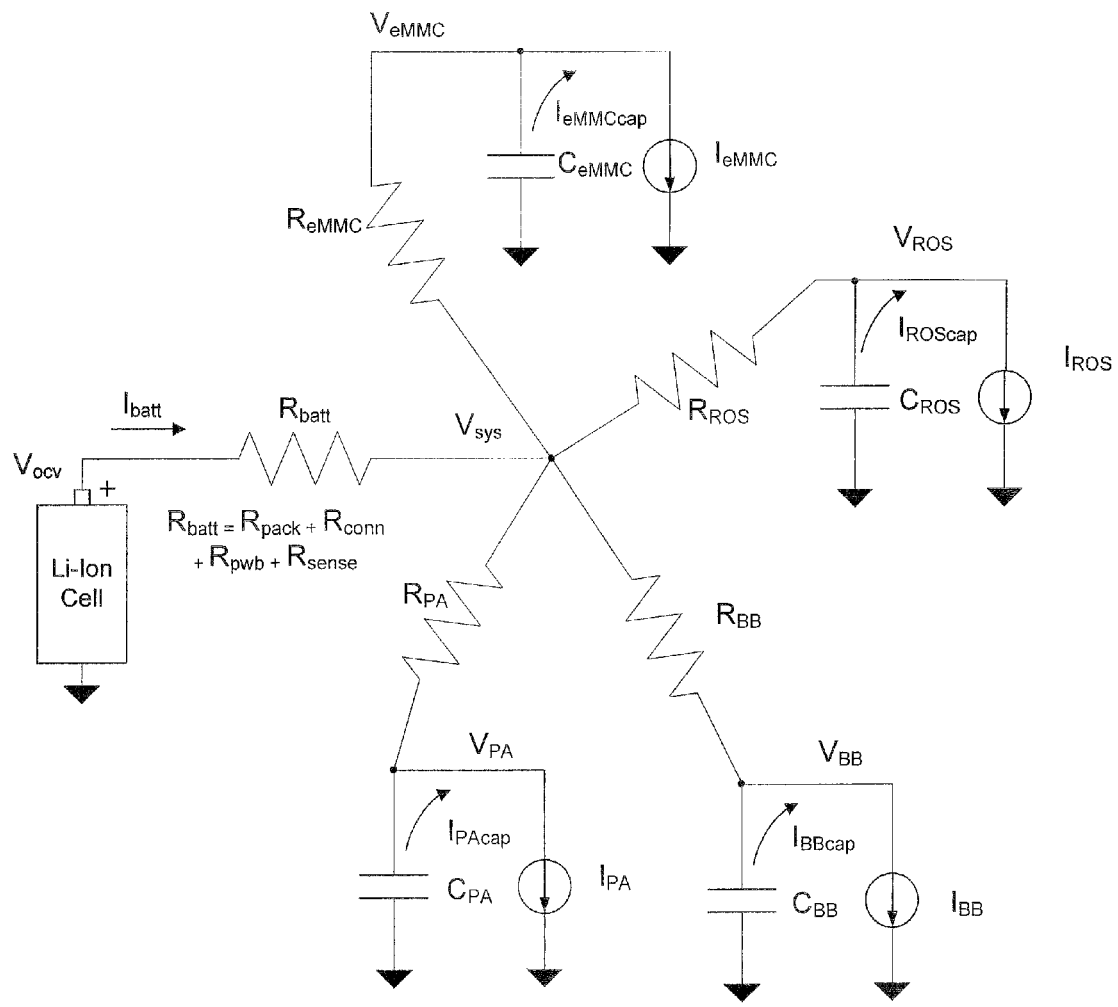

FIGS. 8-10 show circuits that may be used to distribute current in any of the aforementioned devices. In FIG. 8, an equivalent diagram of a battery circuit for an electronic device as previously described is shown including a lithium-ion cell having an open-circuit voltage ($V_{OCV}$), a battery resistance value ($R_{batt}$), and a node defining a system voltage (Vsys). The system current ($I_{SYS}$) is also shown as being derived, in part, from voltage stored in a bulk capacitor ($C_{BULK}$). In FIGS. 9 and 10, different circuit topologies are shown for distributing system power and current to various sub-systems in the phone.

In accordance with another embodiment, an electronic device comprises a power processor to compute available power from a power source; and a comparator to compare the available power to an amount of power required to concurrently operate a plurality of sub-systems of the electronic device at full power, wherein: the power processor generates one or more control signals in response to a decision signal output from the comparator, and the one or more control signals indicate that a maximum power setting is to be set for a first sub-system and a reduced non-zero power setting is to be set for a second sub-system of the plurality of sub-systems. A non-limiting example of such an electronic device is a smartphone having the features and which performs the operations in FIGS. 1-5.

In accordance with another embodiment, a computer-readable medium stores a program for controlling allocation of power in an electronic device. The computer-readable medium may be an internal memory chip or storage unit of the electronic device or may be coupled to the electronic device through a connector or through another type of communication path.

The program may include code sections to implement any of the operations shown in FIGS. 1-5. In accordance with one non-limiting embodiment, the program includes a first code to compute available power from a power source and second code to compare the available power to an amount of power required to concurrently operate a plurality of sub-systems of the electronic device at full power. The second code may generate one or more control signals in response to a decision signal output from the comparator, and the one or more control signals may indicate that a maximum power setting is to be set for a first sub-system and a reduced non-zero power setting is to be set for a second sub-system of the plurality of sub-systems.

The information in the look-up tables described above may be stored in one or more memory circuits, registers, or another type of storage device included within and/or coupled to the electronic device. Also, although the terms sub-system, circuits, and functions have been separately used at times herein, the term "sub-system" may be generally be understood to cover all of these, at least when used in the claims.

Furthermore, the power control manager as shown in FIG. 1 may be incorporated within a system-on-chip (SoC) arrangement. At least one of the fuel gauge 20, burst controller 30, or driver 40 may be included within or separate from this chip.

Any reference in this specification to an "embodiment" means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Furthermore, for ease of understanding, certain functional blocks may have been delineated as separate blocks; however, these separately delineated blocks should not necessarily be construed as being in the order in which they are discussed or otherwise presented herein. For example, some blocks may be able to be performed in an alternative ordering, simultaneously, etc.

Although the present invention has been described herein with reference to a number of illustrative embodiments, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

We claim:

1. A power control manager comprising:
a calculator to determine power available in an electronic device based on a signal to be received regarding a maximum power available from a power source;
a first storage area to store information for a plurality of device sub-systems; and
a power credit distributor to receive a signal from the calculator regarding the determined power available from the power source, and the power credit distributor to determine one or more power levels for the sub-systems based on the available power received from the calculator and information stored in the first storage area, wherein:
the information stored in the first storage area is to indicate power settings for a plurality of different combinations of the sub-systems when concurrently activated, and
the power settings for one of the plurality of different combinations of the sub-systems are to include a power setting for a first sub-system and a reduced non-zero power setting for a second sub-system, and the reduced non-zero power setting is to be based on at least one derating value for the second sub-system stored in the first storage area, and the at least one derating value is a specific fractional percentage of a maximum power for the second sub-system to be used in operating the second sub-system for a specific setting.

2. The power control manager of claim 1, wherein the power credit distributor is to determine the power levels when the available power is insufficient to concurrently operate at full power a combination of the sub-systems including the first and second sub-systems.

3. The power control manager of claim 1, wherein the one or more power levels for the sub-systems are to be determined in response to a request signal to be received at the power control manager, and wherein the request signal is to indicate the first sub-system or the second sub-system is to be activated.

4. The power control manager of claim 3, wherein the request signal is to be generated in response to a user request signal to be provided from the power control manager for activation of the first or second sub-system.

5. The power control manager of claim 1, wherein the calculator is to determine the power available in the electronic device based on a power envelope to be generated for the electronic device.

6. The power control manager of claim 5, wherein the power envelope is to be generated based on power source information and one or more failure threshold values to be stored in a second storage area.

7. The power control manager of claim 6, wherein the power available in the electronic device is to be based on comparing a remaining power of the power source to the power envelope.

8. The power control manager of claim 6, wherein the power source is a battery.

9. The power control manager of claim 1, wherein the electronic device includes a mobile phone.

10. The power control manager of claim 9, wherein the power credit distributor is to determine the one or more power levels for the sub-systems when a sum of the available power and burst controller power minus an amount of power currently in use is less than an amount of power to concurrently operate the combination of the sub-systems including the first and second sub-systems at full power.

11. A power credit distributor comprising:
a power processor to compute available power from a power source; and
a comparator to compare the available power to an amount of power to concurrently operate a plurality of sub-systems of an electronic device, wherein:
the power processor to receive a decision signal from the comparator,
the power processor is to generate one or more control signals in response to the decision signal output from the comparator and received at the power processor,
the one or more control signals to be generated by the power processor in response to the decision signal are to indicate that a power setting is to be set for a first sub-system and a reduced non-zero power setting is to be set for a second sub-system of the plurality of sub-systems, and the reduced non-zero power setting is to be based on at least one stored derating value received for the second sub-system, and the at least one derating value is a specific fractional percentage of a maximum power for the second sub-system to be used in operating the second sub-system for a specific setting, and
the power processor to output the one or more control signals.

12. The power credit distributor of claim 11, wherein the power processor is to receive a request signal and to generate the one or more control signals in response to the request signal being received at the power credit distributor and indicating the first sub-system or the second sub-system is to be changed from a non-active state to an active state.

13. The power credit distributor of claim 12, wherein the request signal is to be generated in response to a user request signal to be provided from the power credit distributor for activation of the first or second sub-system.

14. The power credit distributor of claim 11, wherein the power source is a battery.

15. The power credit distributor of claim 11, wherein the electronic device includes a mobile phone.

16. The power credit distributor of claim 15, wherein the power processor is to generate the one or more control signals when a sum of the available power and burst controller power minus an amount of power currently in use in the electronic device is less than an amount of power to concurrently operate a combination of sub-systems including the first and second sub-systems at full power.

17. An electronic device comprising:
a plurality of sub-systems including a first sub-system and a second sub-system;
a power processor to compute available power from a power source; and
a comparator to compare the available power to an amount of power to concurrently operate a plurality of sub-systems of the electronic device, wherein:
the power processor is to generate one or more control signals in response to a decision signal output from the comparator, and
the one or more control signals to be generated by the power processor indicate a specific power setting combination that a power setting is to be set for the first sub-system and a reduced non-zero power setting is to be set for the second sub-system of the plurality of sub-systems, and the reduced non-zero power setting is to be based on at least one stored derating value received for the second sub-system, and the at least one derating value is a specific fractional percentage of a maximum power for the second sub-system to be used in operating the second sub-system for a specific setting.

18. The electronic device of claim 17, wherein the electronic device is or includes a mobile phone.

19. The electronic device of claim 17, wherein the power processor is to generate the one or more control signals in response to a request signal indicating the first sub-system or the second sub-system is to be changed from a non-active state to an active state.

20. The electronic device of claim 19, wherein the request signal is to be generated in response to a user request signal for activation of the first or second sub-system.

21. A non-transitory computer-readable storage medium storing a program for controlling allocation of power in an electronic device, the program including:
first code to compute available power from a power source; and
second code to compare the available power to an amount of power to concurrently operate a plurality of sub-systems of the electronic device, wherein the second code is to generate one or more control signals in response to a decision signal output from the comparison, wherein the one or more control signals are to indicate a specific power setting combination that a power setting is to be set for a first sub-system and a reduced non-zero power setting is to be set for a second sub-system of the plurality of sub-systems, the reduced non-zero power setting is to be based on at least one stored derating value for the second sub-system, and the stored derating value is a specific fractional percentage of a maximum power for the second sub-system to be used in operating the second sub-system for a specific setting.

22. The non-transitory computer-readable storage medium of claim 21, wherein the first code is to compute the available power based on a power envelope for the device.

23. The non-transitory computer-readable storage medium of claim 22, wherein the power envelope is to be based on power source information and one or more stored failure threshold values.

24. The power control manager of claim 1, wherein the power setting for the first sub-system is to be a maximum power setting.

25. The power credit distributor of claim 11, wherein the power setting to be set for the first sub-system is to be a maximum power setting.

26. The non-transitory computer-readable storage medium of claim 21, wherein the power setting to be set for the first sub-system is to be a maximum power setting.

* * * * *